United States Patent
Kamimura et al.

(10) Patent No.: US 7,564,641 B2
(45) Date of Patent: Jul. 21, 2009

(54) CONTROLLER-CHARACTERISTIC CHANGING APPARATUS, STORAGE DEVICE, CONTROLLER-CHARACTERISTIC CHANGING METHOD, AND COMPUTER PRODUCT

(75) Inventors: Mitsuo Kamimura, Kawasaki (JP); Fumiya Kudo, Kawasaki (JP); Yukio Abe, Kawasaki (JP); Atsushi Suzuki, Kawasaki (JP); Takeshi Hara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/590,725

(22) Filed: Oct. 31, 2006

(65) Prior Publication Data

US 2007/0291399 A1 Dec. 20, 2007

(30) Foreign Application Priority Data

Jun. 15, 2006 (JP) .............................. 2006-166610

(51) Int. Cl.
*G11B 21/02* (2006.01)
*G11B 5/596* (2006.01)
(52) U.S. Cl. ..................................... 360/75; 360/77.02
(58) Field of Classification Search ........................ None
See application file for complete search history.

(56) References Cited

U.S. PATENT DOCUMENTS

| 6,580,579 | B1 | 6/2003 | Hsin et al. |
| 6,937,428 | B2 | 8/2005 | Ho et al. |
| 2002/0034036 | A1* | 3/2002 | Sri-Jayantha et al. ..... 360/77.02 |
| 2003/0058571 | A1* | 3/2003 | Kisaka ..................... 360/78.04 |
| 2006/0072392 | A1* | 4/2006 | Semba et al. ............ 369/44.32 |
| 2007/0070540 | A1* | 3/2007 | Noguchi et al. ............... 360/75 |
| 2007/0183076 | A1* | 8/2007 | Baugh et al. .................. 360/75 |

FOREIGN PATENT DOCUMENTS

| JP | 2000-298958 | 10/2000 |
| JP | 2003-505817 | 2/2003 |
| JP | 2004-503893 | 2/2004 |
| JP | 2004-259324 | 9/2004 |

* cited by examiner

*Primary Examiner*—Andrew L Sniezek
(74) *Attorney, Agent, or Firm*—Fujitsu Patent Center

(57) ABSTRACT

When a head is subjected to external vibration while a controller is controlling the head according to a positioning-oriented controller characteristic, the positioning-oriented controller characteristic are changed to a vibration-reducing controller characteristic. Moreover, when the external vibration stop while the controller is controlling the head according to the vibration-reducing controller characteristic, the vibration-reducing controller characteristic are changed to the positioning-oriented controller characteristic.

16 Claims, 5 Drawing Sheets

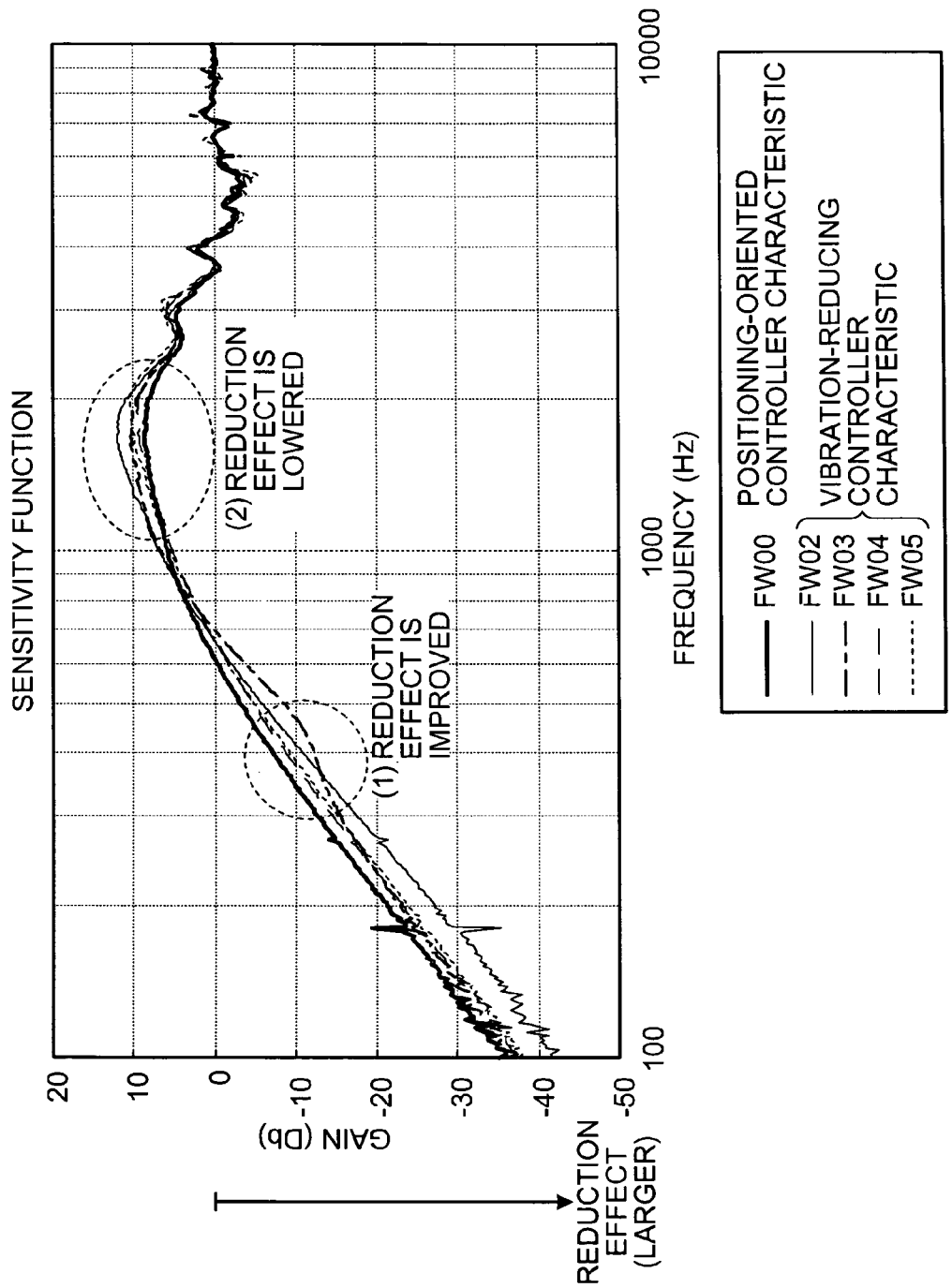

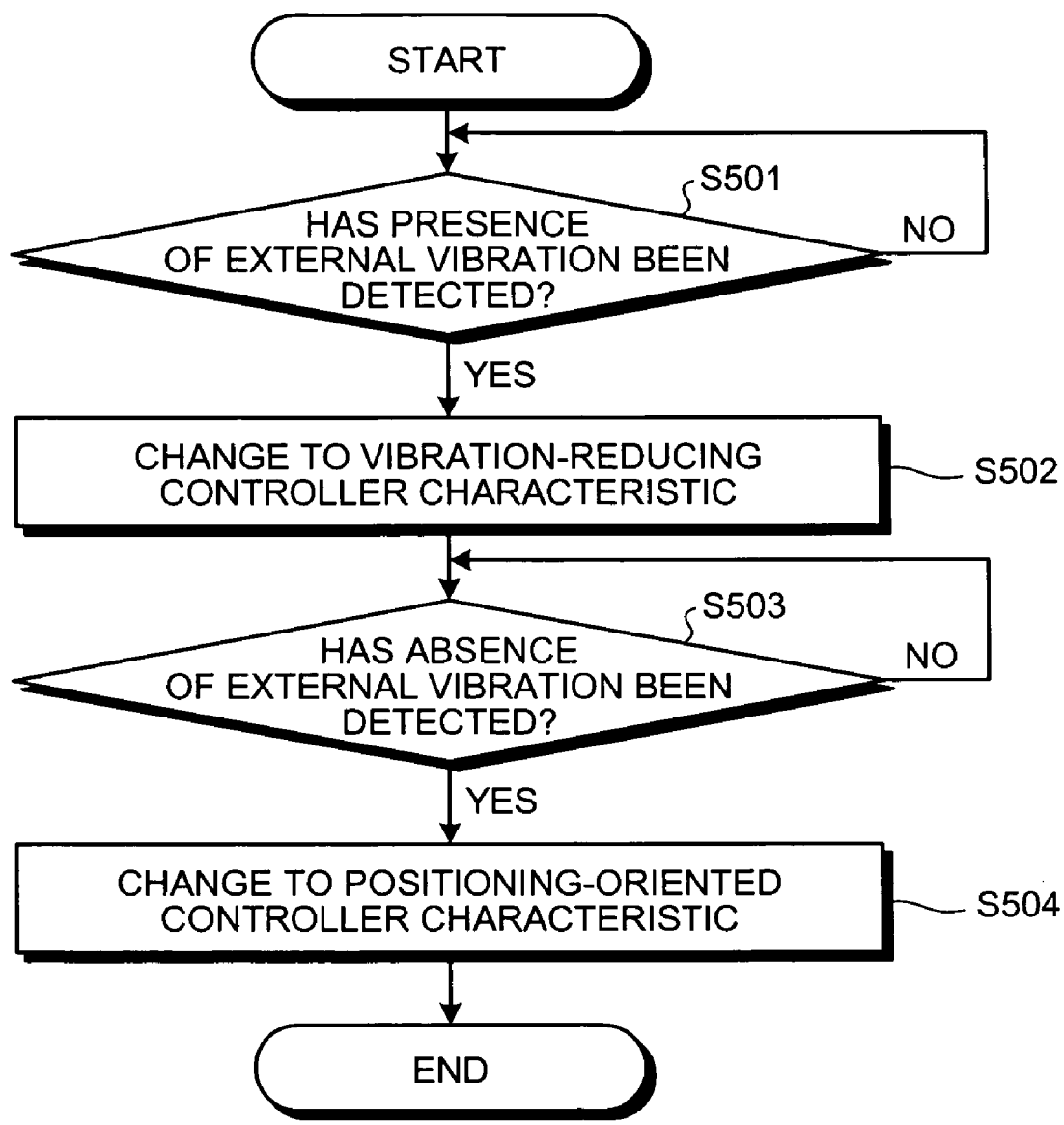

CONTROLLER-CHARACTERISTIC CHANGING APPARATUS, STORAGE DEVICE, CONTROLLER-CHARACTERISTIC CHANGING METHOD, AND COMPUTER PRODUCT

BACKGROUND OF THE INVENTION

1. Field of the Invention

The present invention relates to a controller-characteristic changing apparatus, a storage device, a controller-characteristic changing method, and a computer product.

2. Description of the Related Art

Sometimes resonance occurs in the internal mechanism (the unit including a head and an actuator arm, for example) of a disk apparatus. The performance of the entire apparatus including a host computer from drops when such resonance occurs. One approach is to change a controller characteristic of a controller that controls a disk driving unit (a unit including a head and an actuator arm) in a disk apparatus.

Specifically, when the resonance occurs, a head that is hovering above the disk with a minute gap therebetween is influenced by the resonance, making it likely to cause a read fault and a write fault on the disk. For example, when a write fault occurs, the disk apparatus normally repeats the execution of a retry process of writing on the disk apparatus. The repetitive execution of such a retry process results in a longer time for a command process to be performed in the host computer of the disk apparatus. This leads to a drop in the performance of the entire apparatus including the host computer.

As a solution to this problem, there has been proposed; a method of changing a controller characteristic of a controller that controls a disk driving unit in a disk apparatus. For example, Japanese Patent Application Laid-open No. 2004-503893 discloses a method of changing a controller characteristic of a controller that controls a disk driving unit to reduce the influence of resonance that is caused by resonance of an actuator arm. Japanese Patent Application Laid-open No. 2000-298958 discloses a method of changing a controller characteristic of a controller that controls a disk driving unit to reduce the influence of resonance that is caused by deterioration of the disk driving unit.

With the conventional techniques, the influence of an external vibration caused by an external factor cannot be reduced. That is, when an external vibration caused by an external factor occurs in a disk apparatus, a read fault and a write fault to a disk are likely to occur, thus resulting in lower performance of the entire apparatus including the host computer. However, the methods disclosed in Japanese Patent Application Laid-open Nos. 2004-503893 and 2000-298958 merely change the controller characteristic based on resonance or deterioration of a component in the disk apparatus, or simply change the controller characteristic that effectively reduce the influence of resonance, so that the influence of an external vibration caused by an external factor cannot be reduced.

SUMMARY OF THE INVENTION

It is an object of the present invention to at least partially solve the problems in the conventional technology.

According to an aspect of the present invention, a controller-characteristic changing apparatus that changes a controller characteristic of a controller that controls positioning of a head that performs at least one of data writing and data reading with respect to a storage medium, includes an vibration detector that detects whether the head is subjected to external vibration due to an external factor; a first changing unit that, when the vibration detector detects the external vibration while the controller is controlling the positioning of the head according to a positioning-oriented controller characteristic that takes an accuracy of positioning the head into account, changes the positioning-oriented controller characteristic to a vibration-reducing controller characteristic that improves a reduction effect of vibration of a low frequency band; and a second changing unit that, when the vibration detector detects absence of the external vibration while the controller is controlling the positioning of the head according to the vibration-reducing controller characteristic, changes the vibration-reducing controller characteristic to the positioning-oriented controller characteristic.

According to another aspect of the present invention, a storage device including a controller that controls positioning of a head that performs at least one of data writing and data reading with respect to a storage medium, based on a controller characteristic, includes an vibration detector that detects whether the head is subjected to external vibration due to an external factor; a first changing unit that, when the vibration detector detects the external vibration while the-controller is controlling the positioning of the head according to a positioning-oriented controller characteristic that takes an accuracy of positioning the head into account, changes the positioning-oriented controller characteristic to a vibration-reducing controller characteristic that improves a reduction effect of vibration of a low frequency band; and a second changing unit that, when the vibration detector detects absence of the external vibration while the controller is controlling the positioning of the head according to the vibration-reducing controller characteristic, changes the vibration-reducing controller characteristic to the positioning-oriented controller characteristic.

According to still another aspect of the present invention, a method of changing a controller characteristic of a controller that controls positioning of a head that performs at least one of data writing and data reading with respect to a storage medium, includes detecting whether the head is subjected to external vibration due to an external factor; changing, when the vibration detector detects the external vibration while the controller is controlling the positioning of the head according to a positioning-oriented controller characteristic that takes an accuracy of positioning the head into account, the positioning-oriented controller characteristic to a vibration-reducing controller characteristic that improves a reduction effect of vibration of a low frequency band; and changing, when the vibration detector detects absence of the external-vibration while the controller is controlling the positioning of the head according to the vibration-reducing controller characteristic, the vibration-reducing controller characteristic to the positioning-oriented controller characteristic.

According to still another aspect of the present invention, a computer-readable recording medium stores therein a computer program that the above method on a computer.

The above and other objects, features, advantages and technical and industrial significance of this invention will be, better understood by reading the following detailed description of presently preferred embodiments of the invention, when considered in connection with the accompanying drawings.

BRIEF DESCRIPTION OF THE DRAWINGS

FIG. 4 is another explanatory diagram of the controller characteristic; and

FIG. 5 is a flowchart of a process procedure performed by the storage device shown in FIG. 1.

DETAILED DESCRIPTION OF THE PREFERRED EMBODIMENTS

Exemplary embodiments according to the present invention will be explained in detail below with reference to the accompanying drawings. A storage device configured to include the controller-characteristic changing apparatus according to the following embodiments will be explained in below.

First, the basic terms used in the embodiments to be explained below will be explained. A "storage device" is a device mainly including a disk on which data is recorded, a head that reads and writes data from and on the disk, a voice coil motor (VCM) that moves the head to a predetermined position, and a control circuit that controls the components. In a "disk apparatus", the disk rotates at a given rotational speed and the head hovering above-the disk apparatus reads and writes data therefrom and thereon.

Data reading is accomplished since the head is positioned to a predetermined position over the disk, and reads data recorded at the predetermined position. Data writing is accomplished since the head is positioned to a predetermined position over the disk, and writes data at the predetermined position. The positioning of the head is controlled by a "controller" provided in a micro control unit (MCU) or the like in the disk apparatus.

The positioning of the head that is controlled by the "controller" will be specifically explained. In addition to "user data" that is used in a process to be executed by the host computer, "servo control data" that is used in head positioning control is recorded on the disk. The "servo control data" has position information or the like on the disk recorded therein. When the "servo control data" read by the head is sent to the "controller", the "controller" calculates the current position of the head. The "controller" then executes filter calculation based on the current position of the head, and controls the VCM according to a control value acquired through the filter calculation. Because the VCM is the driving unit that moves the head to a predetermined position as mentioned above, controlling the VCM actually controls the positioning of the head.

Thus, because the "controller" controls the VCM according to the control value acquired through the filter calculation to control the positioning of the head, the control value to be acquired varies and the positioning of the head differs depending on which calculation equation is used in the filter calculation. In this respect, the filter calculation is called "controller characteristic". It is therefore important to execute the filter calculation using which calculation equation, i.e., execute positioning control according to what "controller characteristic".

Figure 1:
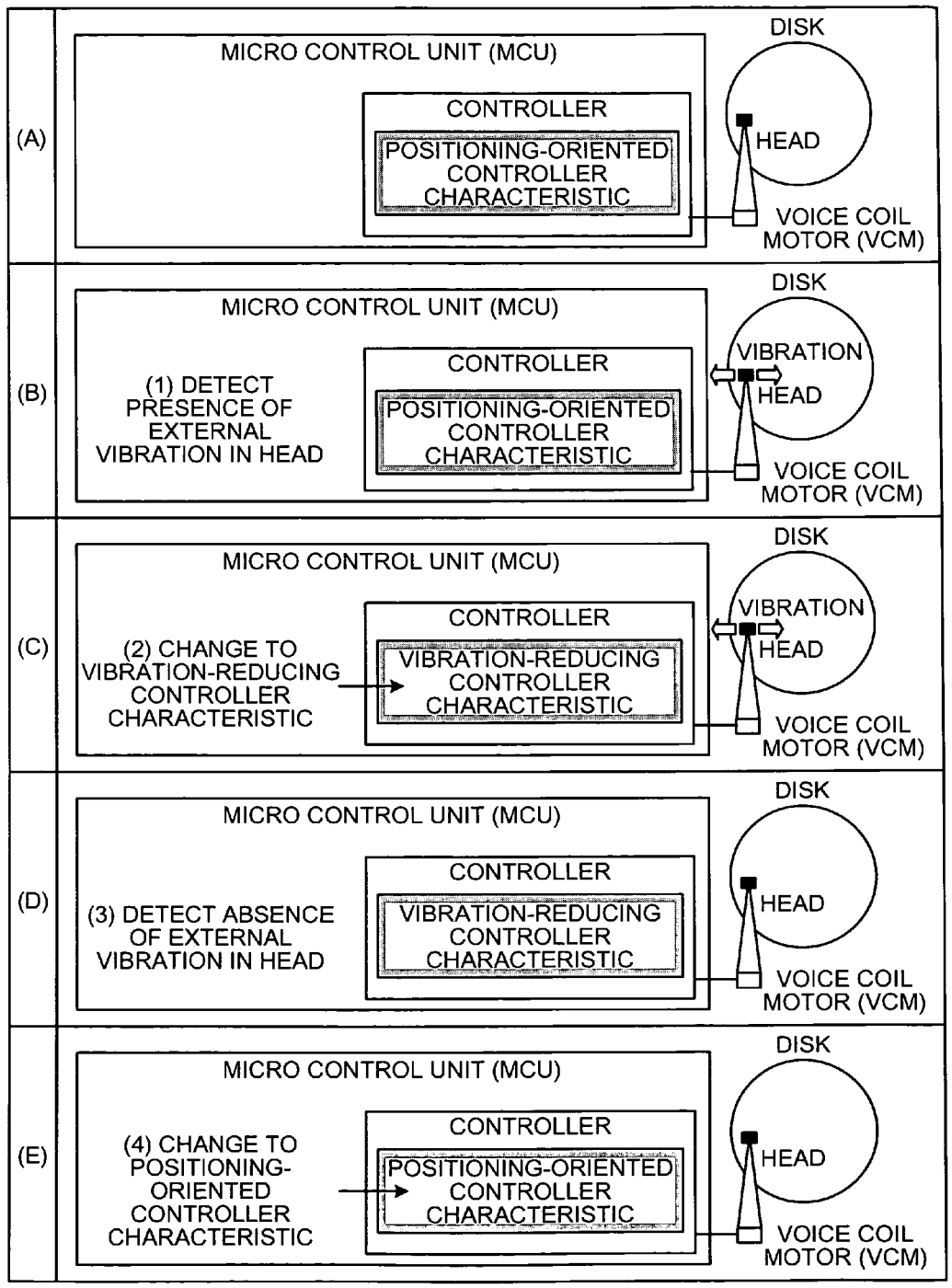
FIG. 1 is a schematic for explaining an outline and salient features of a storage device according to a first embodiment of the present invention.

FIG. 1 is a schematic for explaining the outline and salient features of a storage device 10 according to the embodiment.

The storage device includes a controller that controls the positioning of the head that reads and writes data from and on a disk. The controller controls the positioning of the head based on a controller characteristic. The main feature of the storage device is to reduce the resonance of an external vibration that is caused by an external factor.

The controller of the storage device 10 generally controls the positioning of the head according to a positioning-oriented controller characteristic that takes the accuracy of positioning the head into account, as shown in (A) in FIG. 1.

The controller-characteristic changing apparatus of the storage device 10 detects the presence of an external vibration caused by an external factor (see (1) of (B) in FIG. 1). The controller-characteristic changing apparatus then changes the positioning-oriented controller characteristic to a vibration-reducing controller characteristic that improves a reduction effect of vibration of a low frequency band (see (2) of (C) in FIG. 1).

The controller-characteristic changing apparatus then detects that there is no external vibration in the head (see (3) of (D) in FIG. 1). The controller-characteristic changing apparatus then changes the vibration-reducing controller characteristic to the positioning-oriented controller characteristic (see (4) of (E) in FIG. 1).

The controller characteristic of the controller are set in a manner that improves the reduction effect of vibration of a low frequency band. This configuration can reduce the influence of the external vibration caused by an external factor. The storage device having the controller that controls head positioning control according to the controller characteristic reduces the influence of an external vibration, thus improving the general performance of the storage device.

Figure 2:
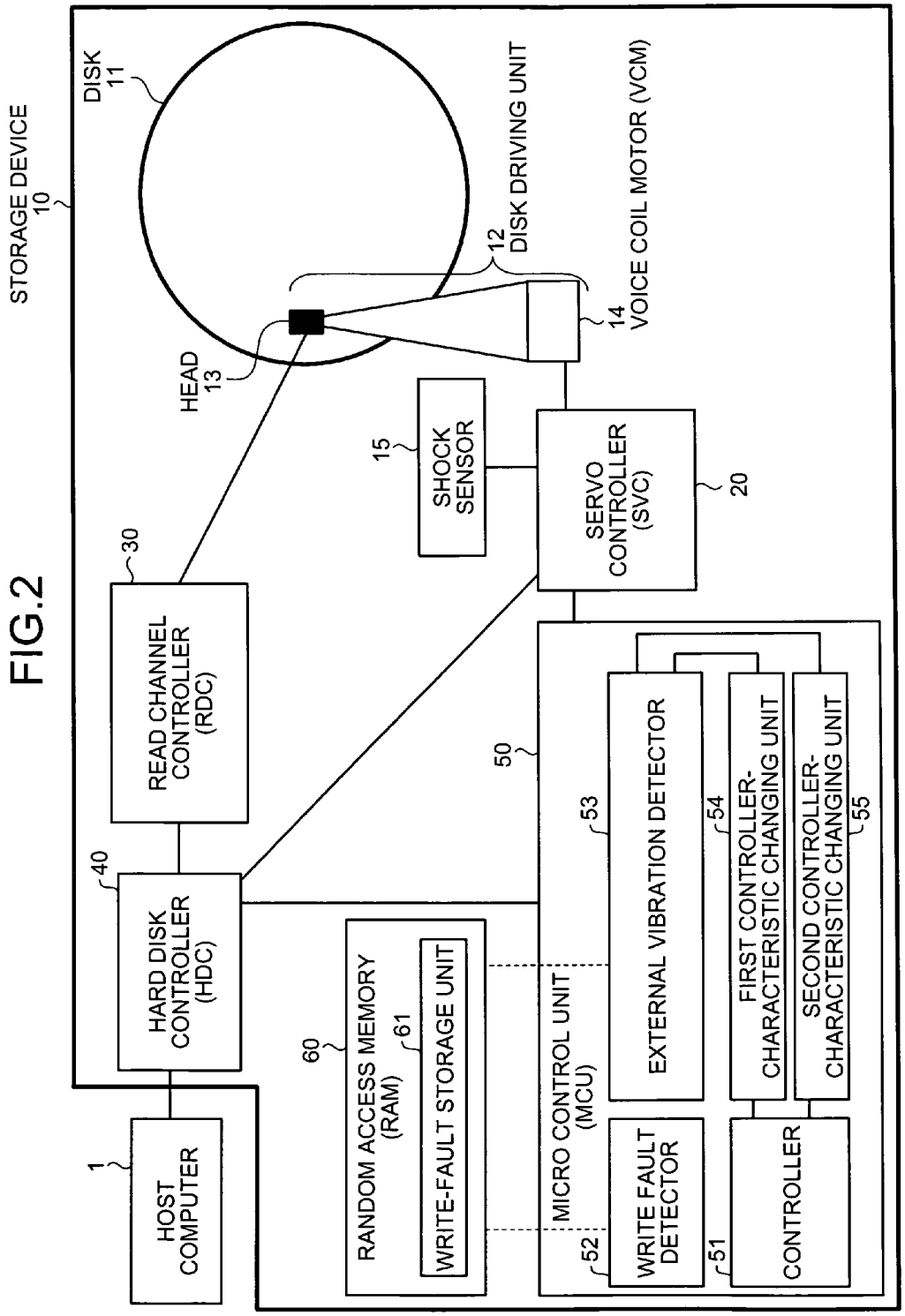
FIG. 2 is a functional block diagram of the storage device shown in FIG. 1.
Figure 3:
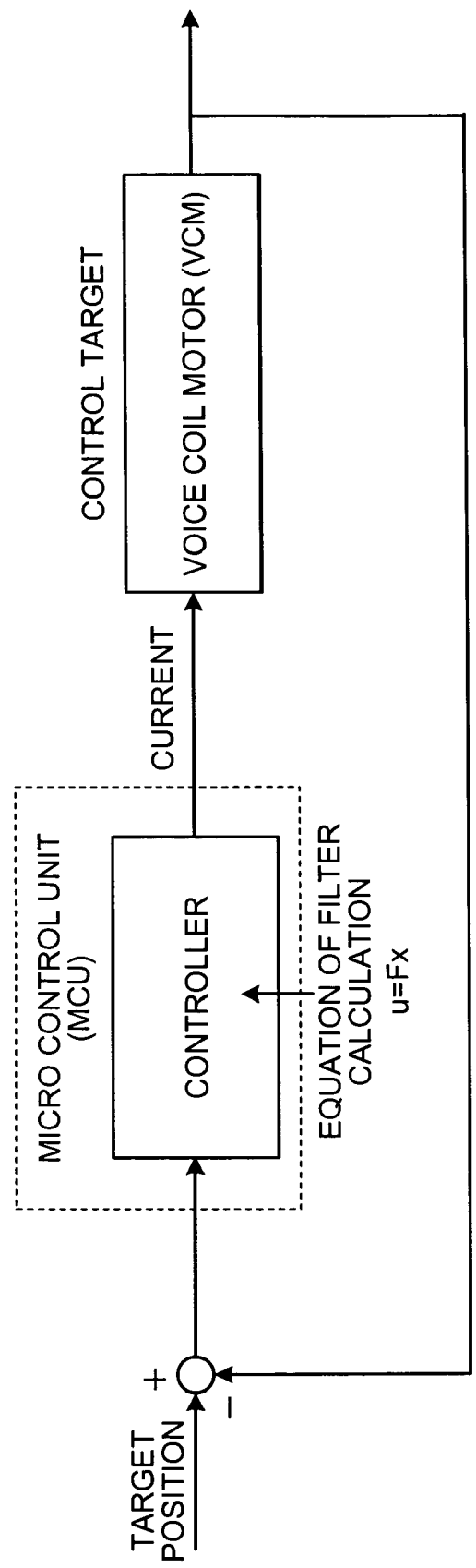
FIG. 3 is an explanatory diagram of a controller characteristic.

With reference to FIGS. 2 to 4, the configuration of the storage device 10 will be explained. FIG. 2 is a functional block diagram of the storage device 10 according to the first embodiment, FIGS. 3 and 4 are explanatory diagrams of a controller characteristic.

As shown in FIG. 2, the storage device 10 includes a disk 11, a disk driving unit 12, a shock sensor 15, a servo controller (SVC) 20, a read channel controller (RDC) 30, a hard disk controller (HDC) 40, a micro control unit (MCU) 50, and a random access memory (RAM) 60. As will be explained below, the controller-characteristic changing apparatus of the storage device 10 is provided in the MCU 50.

User data and servo control data are recorded on the disk 11. Specifically, the disk 11 has a magnetic film formed on a metal or glass disk-like substrate, and user data and servo control data are magnetically recorded on the disk 11. The "user data" is data that is used in a process to be executed by a host computer 1, and the "servo control data" is data that is used in the positioning control of a head 13. The head 13 reads data (user data and servo control data) from the disk 11, and writes data (user data) thereon.

The disk driving unit 12 reads user data and servo control data from the disk 11, and writes user data thereon. As shown in FIG. 2, the disk driving unit 12 includes the head 13 and a voice coil motor (VCM) 14. The head 13 reads and writes data from and on the disk 11. Specifically, the head 13, which includes an element that converts magnetism into an electric signal, reads and writes data while hovering above the rotating disk 11. For instance, the head 13 reads user data and servo control data, both magnetically recorded on the disk 11, and sends the data converted to an electric signal to the RDC 30 via a head amplifier (not shown).

For the head 13 to read and write user data on the disk 11 at a predetermined position, the positioning control of the head 13 needs to be performed in the storage device 10, so that the head 13 is positioned at the predetermined position. The positioning control of the head 13 is accomplished by the VCM 14, the SVC 20, and a controller 51.

The VCM 14 performs the positioning control of the head 13 as mentioned above. Specifically, the VCM 14 is a motor that operates the disk driving unit 12, and the positioning control of the head 13 is performed by rotating the VCM 14. In addition, the VCM 14 is connected to the SVC 20, and is controlled by the SVC 20.

The shock sensor 15 detects vibration occurred in the storage device 10. Specifically, the shock sensor 15, which includes a piezoelectric element, electrically detects vibration caused in the storage device 10 by converting the vibration to a voltage by piezoelectric effect. The shock sensor 15, connected to the SVC 20, sends information on the vibration detected in the storage device 10 to the SVC 20. When the shock sensor 15 detects vibration, and sends information on the vibration to the SVC 20, for example, the SVC 20 controls the VCM 14 so that the head 13 retracts from the-disk 11.

The SVC 20 mainly drives a spindle motor (SPM) (not shown), and the VCM 14. Specifically, the SVC 20 includes a power circuit that drives the SPM that rotates the disk 11, and a power circuit that drives the VCM 14 that performs the positioning control of the head 13, and is connected to the SPM (not shown), the VCM 14, the shock sensor 15, the HDC 40 and the MCU 50.

For example, the SVC 20 receives a control value acquired through a filter calculation-in the controller 51 to be explained later from the MCU 50, and controls the VCM 14 based on the control value. The SVC 20 also receives information on vibration input from the shock sensor 15, and controls the VCM 14 based on the vibration information. The SVC 20 sends the vibration information to the HDC 40, the MCU 50 and the like.

The RDC 30 mainly performs code demodulation on data read from the disk 11, and performs code modulation on data to be written on the disk 11. Specifically, the RDC 30 includes a circuit for signal processing of data, and a circuit that acquires position information or the like on the disk from the servo control data, and is connected to the head 13 and the HDC 40 (Note that the RDC 30 is connected to the head 13 via a head amplifier (not shown)).

The HDC 40 mainly performs interface control between the host computer 1 and the storage device 10, and interface control on the individual units in the storage device 10. The HDC 40 is connected to the host computer 1, the SVC 20, the RDC 30, and the MCU 50. The HDC 40 includes an error correction circuit and an interface control circuit. The error correction circuit corrects an error in data to be transferred between the host computer 1 and the storage device 10. The interface control circuit controls an interface or the like between the RDC 30 and the MCU.50.

For example, the HDC 40 receives data (user data) input from the host computer 1, adds an error correction code to the data, and sends the data to the RDC 30. For example, the HDC 40 receives data (user data) input from the RDC 30, performs error correction on the data according to need, and sends the data to the host computer 1.

The MCU 50 mainly performs the general control of the storage device 10,-and the positioning control of the head 13. Specifically, the MCU 50 includes a central processing unit (CPU) and a read only memory (ROM), and is connected to the SVC 20, the HDC 40 and the RAM 60. As shown in FIG. 2, the MCU 50 includes, as what is particularly relevant to the present invention, the controller 51, a write fault detector 52, an external vibration detector 53, a first controller-characteristic changing unit 54, and a second controller-characteristic changing unit 55, which are constituted by program modules of the firmware of the CPU.

The controller 51 in the MCU 50 controls the positioning control of the head 13 that reads and writes data from and on the disk 11. The positioning control of the head 13 that is executed by the controller will be specifically explained. The controller 51 receives input servo control data read from the disk 11 by the head 13. Since the servo control data includes position information or the like on the disk 11 recorded therein, the controller 51 calculates the current position of the head 13. The controller 51 then performs filter calculation based on the current position of the head 13, and sends a control value acquired through the filter calculation to the SVC 20. The SVC 20 controls the VCM 14 based on the control value. Because the VCM 14 is the driving unit that moves the head 13 to a predetermined position, controlling the VCM 14 controls the positioning of the head 13. The positioning control is an open loop control as shown in FIG. 3.

The equation for the filter calculation is called "controller characteristic" of the controller 51. Since the controller 51 controls the VCM 14 based on the control value acquired through the filter calculation to control the positioning of the head 13, the control value to be acquired-varies and the positioning of the head differs depending on which controller characteristic is used in positioning control. The controller characteristic of the controller 51 according to the first embodiment is expressed by $u = Fx$ as shown in FIG. 3 where u is the current (operation amount) that flows in the VCM 14, x is the status variable of an observer (e.g., an estimated speed, an estimated position or the like), and F is a coefficient.

When the value of the coefficient F increases, for example, the servo band increases, thus improving the reduction effect of vibration of a low frequency band. Accordingly, the controller 51 according to the first embodiment changes the controller characteristic to the "vibration-reducing controller characteristic" to improve the reduction effect of vibration of a low frequency band. At this time, the vibration-reducing controller characteristic deteriorates the head positioning accuracy particularly in a high frequency band. On the other hand, when the value of the coefficient F decreases, the servo band decreases, thus reducing the reduction effect of vibration of a low frequency band. At this time, such a controller characteristic improves the head positioning accuracy. Accordingly, the controller 51 according to the first embodiment changes the controller characteristic to the "positioning-oriented controller characteristic" that takes the head positioning accuracy into account. Although Equation $u = Fx$ has been explained as the equation for the controller characteristic of the controller 51 according to the first embodiment, the present invention is not limited to this case, and the equation can be employed as long as it is an equation for calculating a control value that takes the head positioning accuracy into account and an equation for calculating a control value that improves the reduction effect of vibration of a low frequency band.

The reduction effect of vibration will be explained referring to FIG. 4. FIG. 4 is a plot of the reduction rate of the vibration of the head of the disk apparatus (vertical axis) for each frequency (horizontal axis). A negative value on the vertical axis means that the reduction effect of vibration is improved. A positive value on the vertical axis means that the reduction effect of vibration is lowered and the vibration is increased. FIG. 4 is a plot of five types of controller characteristics of the controller. FW00 (thick solid line) is the "positioning-oriented controller characteristic" that takes the head positioning accuracy into account, while the other four lines FW02, FW03, FW04, and FW05 represent the "vibration-reducing controller characteristic" to improve the reduction effect of vibration of a low frequency band.

Paying attention to the frequency of 300 hertz to 500 hertz or the like, the four lines for the "vibration-reducing controller characteristic" take negative values with respect to the thick solid line for the "positioning-oriented controller characteristic". This shows that the reduction effect of vibration is improved (see (1) in FIG. 4). With regard to the frequency of 1 to 2.5 kilohertz or the like, the four lines for the "vibration-reducing controller characteristic" take positive values with respect to the thick solid line for the "positioning-oriented controller characteristic". This shows that the reduction effect of vibration is lowered (see (2) in FIG. 4). That is, it is understood that the reduction effect of vibration can be improved more when the controller characteristic is the "vibration-reducing controller characteristic" rather than the "positioning-oriented controller characteristic" for vibration with the frequency of about 300 hertz to 500 hertz, whereas the reduction effect of vibration becomes poorer (the vibration becomes greater) when the controller characteristic is the "positioning-oriented controller characteristic" for vibration with the frequency of about 1 kilohertz to 2.5 kilohertz.

With reference to FIG. 2, the write fault detector 52 detects that the head 13 did not write on the disk 11 (write fault). Specifically, the write fault detector 52, connected to the HDC 40 and a write-fault storage unit 61, receives information on a write fault from, for example, the HDC 40, detects a write fault, and stores the information in the write-fault storage unit 61.

The external vibration detector 53 detects the presence of an external vibration in the head 13 caused by an external factor. Specifically, the external vibration detector 53 according to the first embodiment acquires the number of times the head 13 failed to write on the disk 11 (write fault number), calculates the number of times the write fault has occurred in a given time (write fault occurrence rate), and detects the presence of an external vibration by checking if the calculated write fault occurrence rate exceeds a predetermined threshold. The external vibration detector 53, connected to the write-fault storage unit 61, the first controller-characteristic changing unit 54, and the second controller-characteristic changing unit 55, acquires the number of write faults occurred (write fault number) from the write-fault storage unit 61, and sends the result of detecting an external vibration to the first controller-characteristic changing unit 54 or the second controller-characteristic changing unit 55.

When the calculated write fault occurrence rate exceeds the predetermined threshold, for example, the external vibration detector 53 understands that the presence of an external vibration of the head 13 has been detected, and sends the detection of the presence of the external vibration of the head 13 to the first controller-characteristic changing unit 54. When the calculated write fault occurrence rate does not exceed the predetermined threshold, the external vibration detector 53 understands that the absence of an external vibration of the head 13 has been detected, and sends the detection of the absence of the external vibration of the head 13 to the second controller-characteristic changing unit 55.

The first controller-characteristic changing unit 54 changes the controller characteristic of the controller 51 from the "positioning-oriented controller characteristic" that takes the head positioning accuracy into account to the "vibration-reducing controller characteristic" that improves the reduction effect of vibration of a low frequency band. Specifically, the first controller-characteristic changing unit 54, connected to the external vibration detector 53 and the controller 51, changes the "positioning-oriented controller characteristic" to the "vibration-reducing controller characteristic" when being notified by the external vibration detector 53 that there is an external vibration in the head 13 while the controller 51 is performing the positioning control of the head 13 based on the "positioning-oriented controller characteristic".

The second controller-characteristic changing unit 55 changes the controller characteristic of the controller 51 from the "vibration-reducing controller characteristic" to the "positioning-oriented controller characteristic". Specifically, the second controller-characteristic changing unit 55, connected to the external vibration detector 53 and the controller 51, changes the "vibration-reducing controller characteristic" to the "positioning-oriented controller characteristic" when being notified by the external vibration detector 53 that there is no external vibration in the head 13 while the controller 51 is performing the positioning control of the head 13 based on the "vibration-reducing controller characteristic".

The RAM 60 temporarily stores data in the storage device 10. Specifically, the RAM 60, which is connected to the MCU 50, temporarily stores data that is used in the MCU 50. The RAM 60 has the write-fault storage unit 61 as what is particularly relevant to the present invention as shown in FIG. 2.

The write-fault storage unit 61 of the RAM 60 stores the number of times the head 13 of the storage device 10 has failed to write (write fault number). Specifically, the write-fault storage unit 61, connected to the write fault detector 52 and the external vibration detector 53, receives the number of write faults detected by the write fault detector 52, and sends the stored number to the external vibration detector 53.

While the storage device 10 has been explained with the configuration shown in FIG. 2, the invention is not limited thereto. For example, various configurations and connection modes are possible, including an integral configuration of the RDC 30, the HDC 40, and the MCU 50, a configuration including other units (not shown), and a configuration including the write-fault storage unit 61 provided in a unit different from the RAM 60 shown in FIG. 2.

FIG. 5 is a flowchart of a process procedure performed by the storage device 10. Among the processes of the storage device 10, a controller characteristic changing process that is executed by the controller-characteristic changing apparatus (the external vibration detector 53, the first controller-characteristic changing unit 54, and the second controller-characteristic changing unit 55) provided in the storage device 10 will be explained below as a process particularly relevant to the present invention. Assuming that positioning of the head 13 is generally controlled according to the positioning-oriented controller characteristic that takes the positioning accuracy of the head 13 into account, a process procedure when an external vibration has occurred in the head 13 of the storage device 10 will be explained below.

The storage device 10 determines whether the external vibration detector 53 has detected the presence of an external vibration in the head 13 caused by an external factor (Step S501). Specifically, the storage device 10 acquires the number of times the head 13 has failed to write on the disk 11 (write fault number) from the write-fault storage unit 61, calculates a write fault occurrence rate from the acquired write fault number, and determines whether the calculated write fault occurrence rate exceeds a predetermined threshold. When the calculated write fault occurrence rate does not exceed the predetermined threshold ("No" at Step S501), the storage device 10 determines that the external vibration detector 53 has detected the absence of an external vibration in the head 13, and returns to the process of determining whether the presence of an external vibration in the head 13 has been detected (S501).

In the external vibration detector 53, when the calculated write fault occurrence rate exceeds the predetermined threshold ("Yes" at Step S501), the first controller-characteristic changing unit 54 of the storage device 10 changes the controller characteristic of the controller 51 to the vibration-reducing controller characteristic (Step S502). Specifically, when the presence of an external vibration in the head 13 is detected while the controller 51 is performing the positioning control of the head 13 according to the positioning-oriented controller characteristic, the first controller-characteristic changing unit 54 changes the positioning-oriented controller characteristic to the vibration-reducing controller characteristic.

The storage device 10 then determines whether the external vibration detector 53 has detected the absence of an external vibration in the head 13 caused by an external factor (Step S503). Specifically, the storage device 10 acquires the number of times the head 13 has failed to write on the disk 11 (write fault number) from the write-fault storage unit 61, calculates a write fault occurrence rate from the acquired write fault number, and determines whether the calculated write fault occurrence rate exceeds the predetermined threshold. When the calculated write fault occurrence rate exceeds the predetermined threshold ("No" at Step S503), the storage device 10 determines that the external vibration detector 53 has detected the presence of an external vibration in the head 13, and returns to the process of determining whether the absence of an external vibration in the head 13 has been detected (S503).

Whereas in the external vibration detector 53, when the calculated write fault occurrence rate does not exceed the predetermined threshold ("Yes" at Step S503), the second controller-characteristic changing unit 55 of the storage device 10 changes the controller characteristic of the controller 51 to the positioning-oriented controller characteristic (Step S504). Specifically, when the absence of an external vibration in the head 13 is detected while the controller 51 is performing the positioning control of the head 13 according to the vibration-reducing controller characteristic, the second controller-characteristic changing unit 55 changes the vibration-reducing controller characteristic to the positioning-oriented controller characteristic.

According to the storage device 10, when an external vibration occurs in the head, the controller controls the positioning of the head based on the controller characteristic that improves the effect of reducing vibration of a low-frequency band. This configuration can reduce the influence of an external vibration that is caused by an external factor. The storage device 10 having the controller that performs the positioning control based on the controller characteristic reduces the influence of the external vibration, thus improving the performance of the entire storage device 10.

As explained above, the first embodiment is a controller-characteristic changing apparatus or a storage device, which changes a controller characteristic relating to a controller that controls positioning of a head that performs at least one of data writing and data reading with respect to a storage medium, detects the presence of an external vibration in the head caused by an external factor, changes a positioning-oriented controller characteristic that takes an accuracy of positioning the head into-account to a vibration-reducing controller characteristic that improves a reduction effect of vibration of a low frequency band, when presence of an external vibration in the head is detected while the controller is controlling the positioning of the head according to the positioning-oriented controller characteristic, and changes the vibration-reducing controller characteristic to the positioning-oriented controller characteristic when absence of an external vibration in the head is detected while the controller is controlling the positioning of the head according to the vibration-reducing controller characteristic. When an external vibration occurs in the head, therefore, the positioning of the head is controlled based on the controller characteristic that improves the reduction effect of vibration of a low frequency band. This configuration can reduce the influence of the external vibration caused by an external factor.

Furthermore, according to the first embodiment, the number of times the head has failed to write on a storage medium is acquired, and the presence of an external vibration is detected depending on whether a value relating to the acquired write fault number exceeds a predetermined threshold. Accordingly, the presence of an external vibration is detected using write faults that are used in an ordinary disk apparatus without using a new vibration detecting mechanism. This makes it possible to easily detect the presence of an external vibration, and reduce the influence of the external vibration.

The first embodiment has been explained with the external vibration detector that acquires the number of times the head has failed to write on a storage medium, and detects the presence of an external vibration depending on whether a value relating to the acquired write fault number (write fault occurrence rate) exceeds a predetermined threshold. However, the present invention is not limited to this type of detector, and can be similarly adapted to a detector that acquires a position signal indicating the position of the head on the disk, and detects the presence of an external vibration depending on whether the value of the acquired position signal exceeds a predetermined threshold.

In this case, the external vibration detector acquires a position signal indicating the position of the head in a storage medium, and detects the presence of an external vibration by checking if the value of the acquired position signal exceeds a predetermined threshold. Accordingly, the presence of an external vibration applied to the head is detected by using the position signal to be used in ordinary positioning control of the head without using a new vibration detecting mechanism. This makes it possible to easily detect the presence of an external vibration, and reduce the influence of the external vibration.

The first embodiment has been explained with the external vibration detector that acquires the number of times the head has failed to write on a storage medium, and detects the presence of an external vibration depending on whether a value relating to the acquired write fault number (write fault occurrence rate) exceeds a predetermined threshold. However, the present invention is not limited to this type of detector, and can be similarly adapted to a detector that acquires a position signal indicating the position of the head on the disk, and detects the presence of an external vibration depending on whether a value acquired by filtering the acquired position signal exceeds a predetermined threshold.

The detector that detects the presence of an external vibration by filtering the position signal will be specifically explained. For example, every time the position signal is replaced with an absolute value, the absolute value of the position signal is put through a low-pass filter, and data is computed and created from the absolute value of the low-pass-filtered position signal based on the distance the position of the head is shifted from the proper read or write position and the shift duration time, and the presence of an external vibration is detected depending on whether the created data exceeds a predetermined threshold.

In this case, the external vibration detector detects the presence of an-external vibration by checking if a value acquired by filtering the acquired position signal exceeds a predetermined threshold. Accordingly, the presence of an external vibration applied to the head is detected by using the position signal to be used in the ordinary positioning control of the head without using a new vibration detecting mechanism, and by using the value acquired by filtering. This makes it possible to easily and appropriately detect the presence of an external vibration, and reduce the influence of the external vibration.

The first embodiment has been explained with the external vibration detector that acquires the number of times the head has failed to write on a storage medium, and detects the presence of an external vibration depending on whether a value relating to the acquired write fault number (write fault occurrence rate) exceeds a predetermined threshold. However, the present invention is not limited to this type of detector, and can be similarly adapted to a detector that detects the presence of an external vibration depending on whether a detection signal from the shock sensor that is set to a predetermined sensitivity to detect an external vibration is acquired.

In this case, the external vibration detector detects the presence of an external vibration by checking if a detection signal acquired from the shock sensor that is set to a predetermined sensitivity to detect an external vibration. Accordingly, the presence of an external vibration is detected using the shock sensor to be used in an ordinary disk apparatus without using a new vibration detecting mechanism. This makes it possible to easily detect the presence of an external vibration, and reduce the influence of the external vibration.

The first embodiment has been explained with the external vibration detector that acquires the number of times the head has failed to write on a storage medium, and detects the presence of an external vibration depending on whether a value relating to the acquired write fault number (write fault occurrence rate) exceeds a predetermined threshold. However, the present invention is not limited to this type of detector, and can be similarly adapted to a detector that acquires the number of write faults, assuming that the head has failed to write on the disk at least one of a case that a position signal from the shock sensor that is set to a predetermined sensitivity to detect an external vibration is acquired and a case that a position signal indicating the position of the head on the disk is acquired and the value of the acquired position signal exceeds a predetermined threshold, and detects the presence of an external vibration depending on whether a value relating to the acquired number of write faults exceeds the predetermined threshold.

In this case, in at least one of a case that the detection signal from the shock sensor that is set to a predetermined sensitivity to detect an external vibration is acquired and a case that a position signal indicating the position of the head in a storage medium is acquired and the value of the acquired position signal exceeds a predetermined threshold, the number of times when writing has failed is acquired, assuming that the head failed to write on the storage medium. Accordingly, the presence of an external vibration is detected by using the shock sensor to be used in an ordinary disk apparatus or using the position signal to be used in the ordinary positioning control of the head without using a new vibration detecting mechanism. This makes it possible to easily detect the presence of an external vibration, and reduce the influence of the external vibration. Furthermore, either when the detection signal from the shock sensor is acquired or when the value of the acquired position signal exceeds a predetermined threshold, it is determined that a write fault has occurred. This makes it possible to detect the presence of an external vibration caused by an external factor without fail, thereby reducing the influence of the external vibration.

The first embodiment has been explained with the external vibration detector that acquires the number of times the head has failed to write on a storage medium, and detects the presence of an external vibration depending on whether a value relating to the acquired write fault number (write fault occurrence rate) exceeds a predetermined threshold. However, the present invention is not limited to this type of detector, and can be similarly adapted to a detector that acquires the amount of change in an eccentricity correction value to correct eccentricity of a disk, and detects the presence of an external vibration depending on whether the acquired amount of the change exceeds a predetermined threshold in a predetermined frequency band.

The detector that detects the presence of an external vibration based on the amount of change in eccentric correction value will be specifically explained. For example, assuming that the frequency band of the disk apparatus that is susceptible to vibration is around 500 hertz, for example, the presence of an external vibration is detected depending on whether the amount of change in eccentric correction value exceeds a predetermined threshold within a range of 300 hertz to 500 hertz.

In this case, the external vibration detector acquires the amount of change in eccentric correction value for correcting the eccentricity of the storage medium, and detects the presence of an external vibration depending on whether the acquired amount of change exceeds a predetermined threshold in a predetermined frequency band. Accordingly, the presence of an external vibration applied to the head is detected by using the eccentric correction value to be used in the ordinary positioning control of the head and without using a new vibration detecting mechanism. This makes it possible to easily detect the presence of an external vibration, and reduce the influence of the external vibration.

Although the first embodiment has been explained with the method of changing the vibration-reducing controller characteristic to the positioning-oriented controller characteristic when the absence of an external vibration in the head is detected, the present invention is not limited thereto. The invention can be similarly adapted to, for example, a method of changing the vibration-reducing controller characteristic to the positioning-oriented controller characteristic when the write fault occurrence rate with the controller controlling the positioning of the head based on the vibration-reducing controller characteristic becomes larger than the write fault occurrence rate with the controller controlling the positioning of the head based on the positioning-oriented controller characteristic.

The respective constituents of each device shown in the drawings are functionally conceptual, and physically the same configuration is not always necessary. Further, while the above embodiment has explained a method using firmware of a CPU, the invention is not limited thereto, and methods using other configurations can be also adapted to the invention. In other words, the specific mode of dispersion and integration of the each device is not limited to the ones shown in the drawings (FIG. 2, for example), and all or a part thereof can be functionally or physically dispersed or integrated in an optional unit (for example, the RDC 30, the HDC 40, and the MCU 50 can be integrally configured), according to various kinds of load and a status of use. Further, all or an optional part of the various process functions performed by the each device can be achieved by an MCU (or a processor, such as a CPU or MPU) and a program analyzed and executed by the MCU, or can be achieved as hardware by a wired logic.

The controller-characteristic changing method (an external vibration detecting program, a first controller characteristic changing program, and a second controller characteristic changing program) described in the above embodiments can be achieved by making the MCU in a disk apparatus as a computer execute a program. These programs (the external vibration detecting program, the first controller characteristic changing program, and the second controller characteristic changing program) can be distributed via a network such as the Internet. Further, these programs are stored in a computer-readable recording medium, such as a hard disk, a flexible disk (FD), a compact disk (CD)-ROM, a magneto optical (MO), a digital versatile disk (DVD), and the like, and can be executed by being read from the recording medium by the computer.

According to an aspect of the present invention, when an external vibration occurs in the head, the controller controls the positioning of the head based on the controller characteristic that improves the effect of reducing vibration of a low-frequency band. This configuration can reduce the influence of an external vibration caused by an external factor. Further, the storage device having the controller that performs the positioning control based on the controller characteristic reduces the influence of the external vibration, thus improving the performance of the entire storage device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A controller-characteristic changing apparatus that changes a controller characteristic of a controller that controls positioning of a head that performs at least one of data writing and data reading with respect to a storage medium, the controller-characteristic changing apparatus comprising:
    an vibration detector that detects whether the head is subjected to external vibration due to an external factor;
    a first changing unit that, when the vibration detector detects the external vibration while the controller is controlling the positioning of the head according to a positioning-oriented controller characteristic that takes an accuracy of positioning the head into account, changes the positioning-oriented controller characteristic to a vibration-reducing controller characteristic that improves a reduction effect of vibration of a first frequency band; and
    a second changing unit that, when the vibration detector detects absence of the external vibration while the controller is controlling the positioning of the head according to the vibration-reducing controller characteristic, changes the vibration-reducing controller characteristic to the positioning-oriented controller characteristic, wherein
    a reduction rate of the vibration of the head for the vibration-reducing controller characteristic is higher than a reduction rate of the vibration of the head for the positioning-oriented controller characteristic in the first frequency band, and
    the reduction rate of the vibration of the head for vibration-reducing controller characteristic is lower than the reduction rate of the vibration of the head for positioning-oriented controller characteristic in a second frequency band that is higher than the first frequency band.

2. The controller-characteristic changing apparatus according to claim 1, wherein the vibration detector acquires a position signal indicating a position of the head in the storage medium, and detects whether the head is subjected to the external vibration based on a magnitude of acquired position signal.

3. The controller-characteristic changing apparatus according to claim 1, wherein the vibration detector acquires a position signal indicating a position of the head in the storage medium and filters acquired position signal, and detects whether the head is subjected to the external vibration based on a magnitude of filtered acquired position signal.

4. The controller-characteristic changing apparatus according to claim 1, wherein the vibration detector detects whether the head is subjected to the external vibration based on whether a detection signal from a shock sensor that is set to a predetermined sensitivity is acquired.

5. The controller-characteristic changing apparatus according to claim 1, wherein the vibration detector acquires number of write failures of the head in writing on the storage medium, and detects whether the head is subjected to the external vibration based acquired number of write failures.

6. The controller-characteristic changing apparatus according to claim 5, wherein in at least one of a case that a detection signal from a shock sensor that is set to a predetermined sensitivity is acquired and a case that a position signal indicating a position of the head in the storage medium is acquired and a value of the acquired position signal exceeds a predetermined threshold, the vibration detector determines that the head has failed to write on the storage medium, and acquires the number of write failures of the head.

7. The controller-characteristic changing apparatus according to claim 1, wherein the vibration detector acquires an amount of change in an eccentricity correction value to correct eccentricity of the storage medium, and detects whether the head is subjected to the external vibration based on the acquired amount of the change.

8. A storage device including a controller that controls positioning of a head that performs at least one of data writing and data reading with respect to a storage medium, based on a controller characteristic, the storage device comprising:
    an vibration detector that detects whether the head is subjected to external vibration due to an external factor;
    a first changing unit that, when the vibration detector detects the external vibration while the controller is controlling the positioning of the head according to a positioning-oriented controller characteristic that takes an accuracy of positioning the head into account, changes the positioning-oriented controller characteristic to a vibration-reducing controller characteristic that improves a reduction effect of vibration of a first frequency band; and
    a second changing unit that, when the vibration detector detects absence of the external vibration while the controller is controlling the positioning of the head according to the vibration-reducing controller characteristic, changes the vibration-reducing controller characteristic to the positioning-oriented controller characteristic, wherein
    a reduction rate of the vibration of the head for the vibration-reducing controller characteristic is higher than a reduction rate of the vibration of the head for the positioning-oriented controller characteristic in the first frequency band, and
    the reduction rate of the vibration of the head for vibration-reducing controller characteristic is lower than the reduction rate of the vibration of the head for positioning-oriented controller characteristic in a second frequency band that is higher than the first frequency band.

9. The storage device according to claim 8, wherein the vibration detector acquires a position signal indicating a position of the head in the storage medium, and detects whether the head is subjected to the external vibration based on a magnitude of acquired position signal.

10. The storage device according to claim 8, wherein the vibration detector acquires a position signal indicating a position of the head in the storage medium and filters acquired position signal, and detects whether the head is subjected to the external vibration based on a magnitude of filtered acquired position signal.

11. The storage device according to claim 8, wherein the vibration detector detects whether the head is subjected to the external vibration based on whether a detection signal from a shock sensor that is set to a predetermined sensitivity is acquired.

12. The storage device according to claim 8, wherein the vibration detector acquires number of write failures of the head in writing on the storage medium, and detects whether the head is subjected to the external vibration based acquired number of write failures.

13. The storage device according to claim 12, wherein in at least one of a case that a detection signal from a shock sensor that is set to a predetermined sensitivity is acquired and a case that a position signal indicating a position of the head in the storage medium is acquired and a value of the acquired position signal exceeds a predetermined threshold, the vibration detector determines that the head has failed to write on the storage medium, and acquires the number of write failures of the head.

14. The storage device according to claim 8, wherein the vibration detector acquires an amount of change in an eccentricity correction value to correct eccentricity of the storage medium, and detects whether the head is subjected to the external vibration based on the acquired amount of the change.

15. A method of changing a controller characteristic of a controller that controls positioning of a head that performs at least one of data writing and data reading with respect to a storage medium, the method comprising:
  detecting whether the head is subjected to external vibration due to an external factor;
  changing, when the vibration detector detects the external vibration while the controller is controlling the positioning of the head according to a positioning-oriented controller characteristic that takes an accuracy of positioning the head into account, the positioning-oriented controller characteristic to a vibration-reducing controller characteristic that improves a reduction effect of vibration of a first frequency band; and
  changing, when the vibration detector detects absence of the external vibration while the controller is controlling the positioning of the head according to the vibration-reducing controller characteristic, the vibration-reducing controller characteristic to the positioning-oriented controller characteristic, wherein
  a reduction rate of the vibration of the head for the vibration-reducing controller characteristic is higher than a reduction rate of the vibration of the head for the positioning-oriented controller characteristic in the first frequency band, and
  the reduction rate of the vibration of the head for vibration-reducing controller characteristic is lower than the reduction rate of the vibration of the head for positioning-oriented controller characteristic in a second frequency band that is higher than the first frequency band.

16. A computer-readable recording medium that stores therein a computer program that causes a computer execute a method of changing a controller characteristic of a controller that controls positioning of a head that performs at least one of data writing and data reading with respect to a storage medium, the computer program causes the computer to execute:
  detecting whether the head is subjected to external vibration due to an external factor;
  changing, when the vibration detector detects the external vibration while the controller is controlling the positioning of the head according to a positioning-oriented controller characteristic that takes an accuracy of positioning the head into account, the positioning-oriented controller characteristic to a vibration-reducing controller characteristic that improves a reduction effect of vibration of a first frequency band; and
  changing, when the vibration detector detects absence of the external vibration while the controller is controlling the positioning of the head according to the vibration-reducing controller characteristic, the vibration-reducing controller characteristic to the positioning-oriented controller characteristic, wherein
  a reduction rate of the vibration of the head for the vibration-reducing controller characteristic is higher than a reduction rate of the vibration of the head for the positioning-oriented controller characteristic in the first frequency band, and
  the reduction rate of the vibration of the head for vibration-reducing controller characteristic is lower than the reduction rate of the vibration of the head for positioning-oriented controller characteristic in a second frequency band that is higher than the first frequency band.

* * * * *